Figure 2:
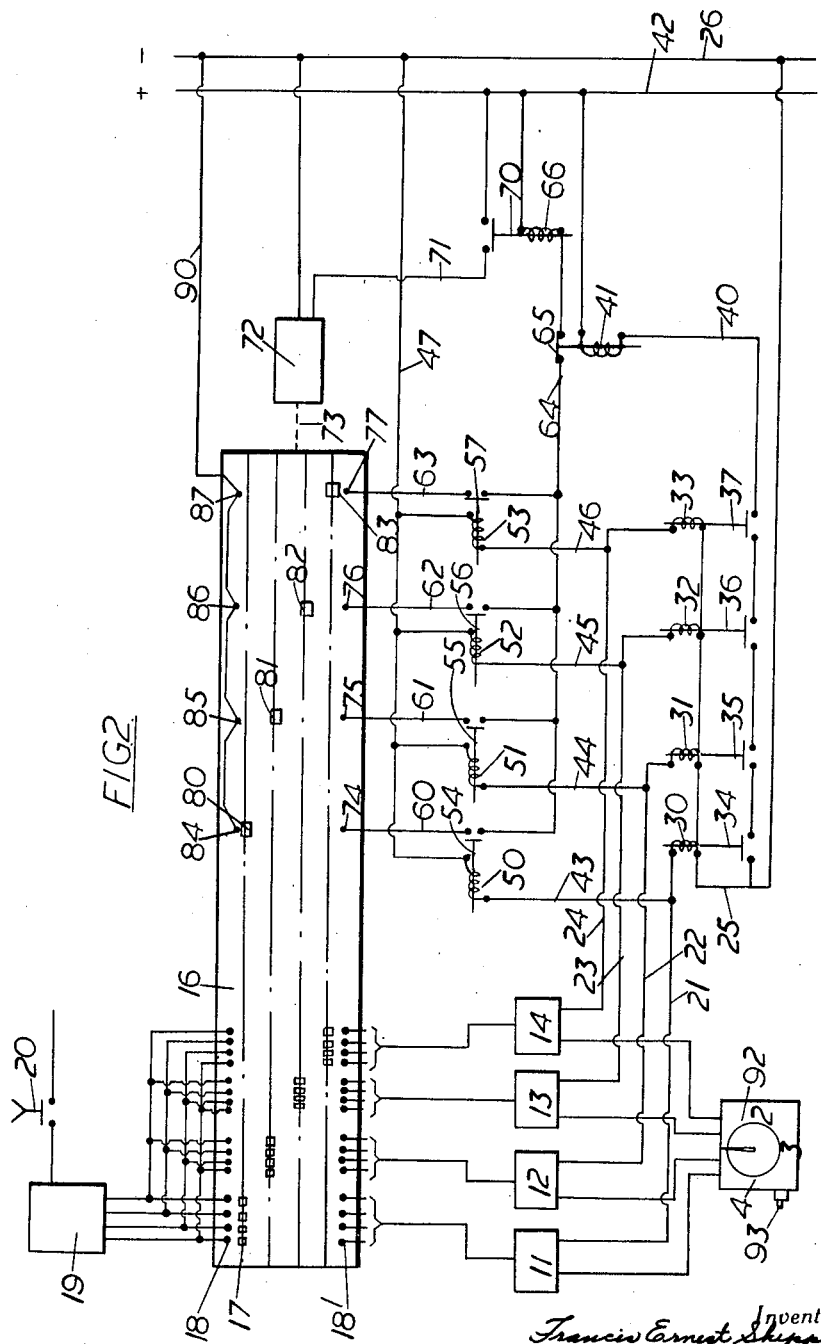

Nov. 30, 1965     F. E. SHEPPARD ETAL     3,220,192
POWER PLANT
Filed July 27, 1964     3 Sheets-Sheet 1
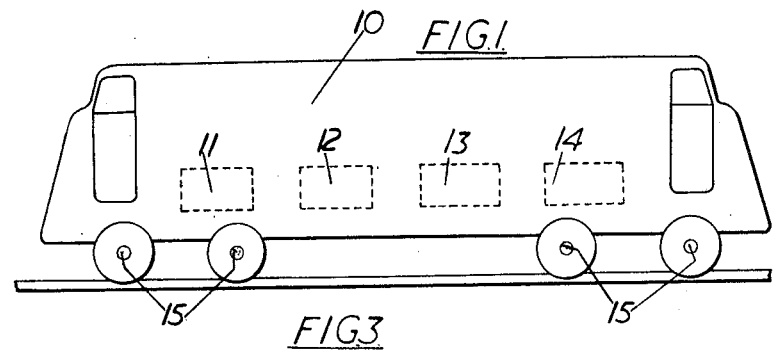
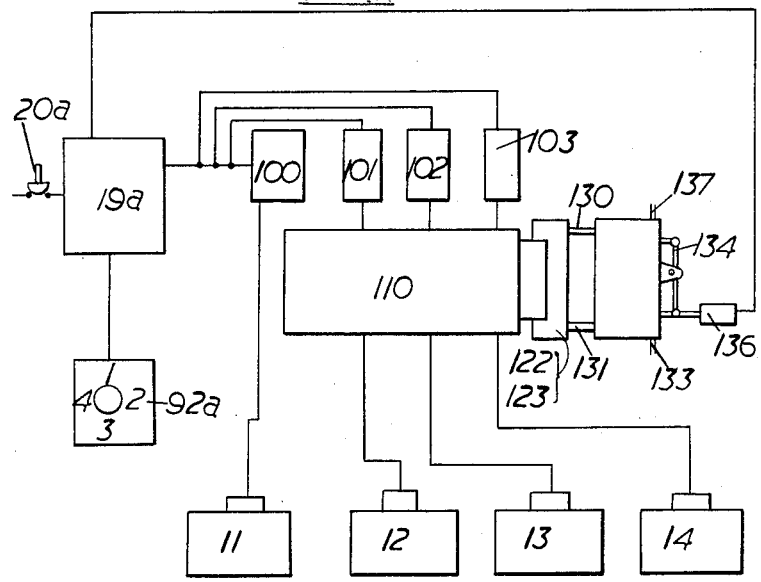
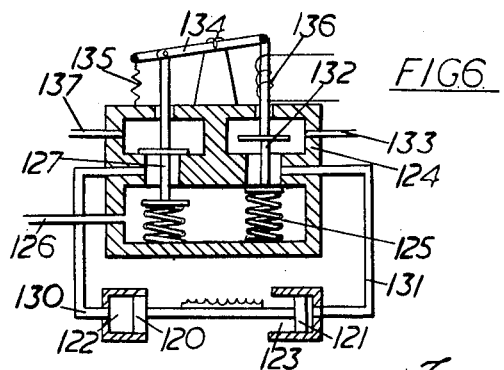
Inventors
Francis Ernest Sheppard
Anthony Wooler
By
Cushman, Darby & Cushman
Attorneys 3,220,192
POWER PLANT
Francis Ernest Sheppard, Oadby, and Anthony Wooler,
  Mickleover, Derby, England, assignors to Rolls-Royce
  Limited, Derby, England, a company of Great Britain
      Filed July 27, 1964, Ser. No. 385,253
  Claims priority, application Great Britain, July 31, 1963,
                   30,463/63
              10 Claims.  (Cl. 60—97)

This invention concerns power plant and, although it is not so restricted, it will be more particularly described with reference to the use of such power plant in a railway locomotive.

A railway locomotive may be provided with a number of separate engines, not all of which are necessarily operated simultaneously. Thus, if, for example, the locomotive is provided with four engines, it may only be necessary to use one or two engines when the locomotive is not drawing a train (e.g. when it is merely being shunted around the yards), whilst it will be necessary to use all four engines when the locomotive is drawing a train and is running at full speed.

It is not unlikely that the driver of the locomotive will use one or more of the engines more frequently than the others, and the object of the present invention is to prevent this from occurring in order to allow the locomotive to run for the maximum possible mileage before it is necessary to visit a main depot in order to change one or more of the engines.

According therefore to the present invention, there is provided power plant comprising a plurality of engines, individual engines or groups of engines of which are adapted to be brought into operation one after another in a predetermined sequence, starting means for starting each of said engines or groups of engines, manually operable means which when operated brings the starting means into operation for a limited period only, said limited period being of sufficient duration to ensure that the respective engine or engines are brought into self-sustaining operation, a selector device which may be set in a plurality of positions or states corresponding in number to the number of engines or groups of engines, the selector device when in each said position or state connecting the starting means to a selected one only (or to a selected group only) of said engines, and setting means which, whenever a said selected engine or group of engines has been brought into self-sustaining operation, but one or more of the engines or groups of engines nevertheless remains inoperative, sets the selector device in the next said position or state, whereby when the said manually operable means is thereafter operated the next engine or group of engines in said sequence will be brought into operation by said starting means.

Preferably, the selector device comprises a movable member which is movable into the said plurality of positions in each of which it establishes an electrical connection between the starting means and one only (or a selected group only) of said engines.

Thus, the movable member is preferably a rotary member which may be set in a plurality of angularly spaced apart positions, the setting means being arranged to rotate the rotary member stepwise from one said position to the next.

The rotary member may be a cam which, when in any of the said positions, is arranged to operate a switch forming part of said electrical connection.

Alternatively, the rotary member may be an electrically conducting drum which is provided with a plurality of contact segments (or groups of contact segments) each of which extends around a limited angular portion of the drum, the contact segments (or groups of contact segments) being angularly spaced from each other, each contact segment being adapted to cooperate with a contactor disposed adjacent the drum, the arrangement being such that, when the drum is in a said position, the said electrical connection is made via the respective contact segment and contactor.

Irrespective of whether the rotary member is a cam or a drum, the setting means may comprise a ratchet which is drivingly connected to the rotary member, a pawl engaging said ratchet, and means for effecting limited angular movement of said pawl in alternate directions of rotation. Thus the pawl may be carried by a pinion which meshes with a rack which itself is connected to a double acting piston device, means being provided for alternately admitting pressure fluid to one or other side of the piston device and for withdrawing it from the opposite side thereof, the arrangement being such that when the manually operable means are operated pressure fluid is supplied to one said side, and when a said selected engine or group of engines has been brought into self-sustaining operation, pressure fluid is supplied to the opposite side.

Alternatively (but again irrespective of whether the rotary member is a cam or a drum), the setting means may be integral with or mechanically connected to the rotary member, the setting means comprising an electrically conducting drum which is provided with a plurality of contact segments (or groups of contact segments) each of which extends around a limited angular portion of the drum, the contact segments (or groups of contact segments) being angularly spaced from each other, each contact segment being adapted to cooperate with a contactor disposed adjacent the drum, each contact segment and its contactor forming part of an electrical circuit including a normally open switch, and means for effecting closure of each said normally open switch whenever the respective engine or group of engines has been brought into self-sustaining operation, the arrangement being such that whenever a said electrical circuit is completed an electric motor is brought into operation to rotate the drum, such rotation breaking the said electrical circuit but, due to the inertia of the drum, continuing until the next contact segment (or group of contact segments) on the drum is brought into contact with the respective contactor or contactors. Thus, each said electrical circuit may also include a normally closed switch, means being provided for opening the normally closed switch whenever all the engines are in operation.

Means are preferably provided for preventing a selected engine or engines from being brought into operation by the starting means.

The engines may be gas turbine engines, although the invention is also applicable to power plants incorporating petrol or diesel engines.

The invention also comprises a locomotive provided with a power plant as set forth above.

Figure 4:
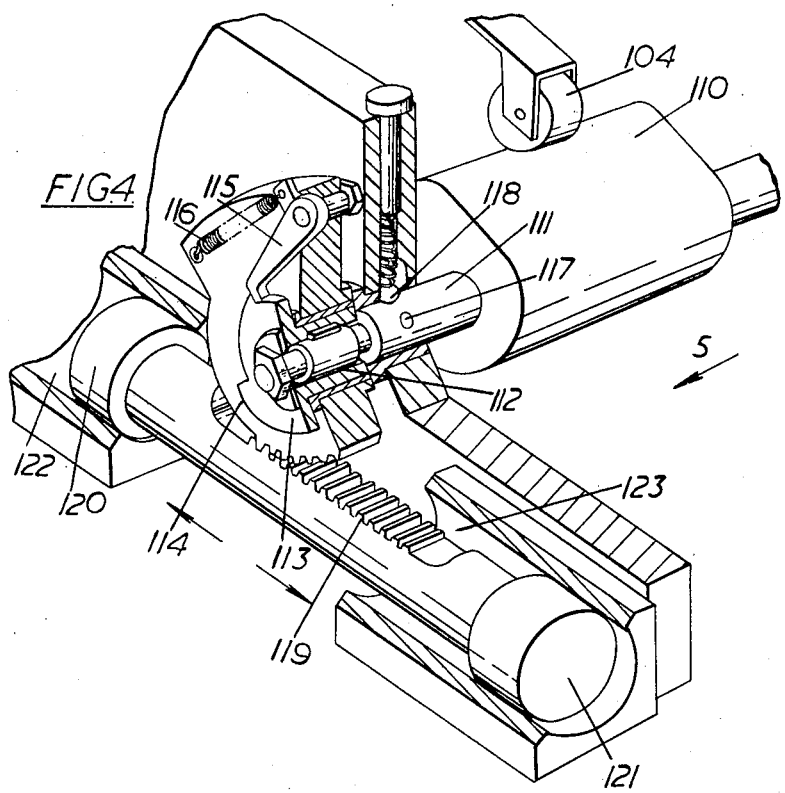
Figure 5:
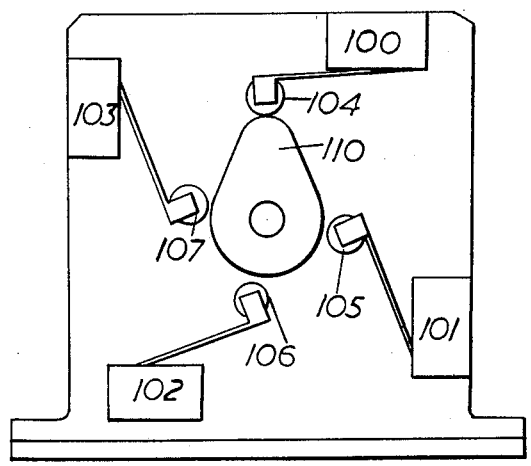

The invention is illustrated, merely by way of example, in the accompanying drawings, in which:

FIGURE 1 is a diagrammatic elevation of a locomotive provided with a power plant according to the present invention, FIGURE 2 is a diagrammatic representation of the power plant of FIGURE 1, showing the electrical connections thereof, FIGURE 3 is a view similar to FIGURE 2, but showing an alternative embodiment of power plant which may be used on the locomotive of FIGURE 1, FIGURE 4 is a sectional perspective view of one part of the power plant of FIGURE 3, FIGURE 5 is a view looking in the direction of the arrow 5 of FIGURE 4, and FIGURE 6 is a diagrammatic sectional view of another part of the power plant of FIGURE 3.

In FIGURE 1, there is shown a railway locomotive 10 which is driven by a power plant comprising four separate gas turbine engines 11, 12, 13, 14. Each of the gas turbine engines 11–14 drives at least one axle 15 through an electrical transmission (not shown) which may include generators driven by the gas turbine engines and electric motors which rotate the axles 15.

Referring now to FIGURE 2, the said power plant comprises a rotary electrically conducting drum 16 which is provided with four groups of contact segments 17, each said group consisting of four segments 17. Each of the contact segments 17 extends around a limited angular portion of the drum 16, the various groups of contact segments 17 being angularly spaced from each other by 90° intervals. Each of the contact segments 17 is adapted to cooperate with a contactor 18 which is disposed closely adjacent to, but out of contact with, the drum 16. The drum 16 is settable in four positions which are spaced from each other by 90° intervals, the arrangement being that in each of these four positions one particular group of contact segments 17, and only one such group, is in electrical contact with its respective contactors 18.

Each of the gas turbine engines 11–14 has an high tension electrical igniter (not shown), which is respectively electrically connected to a group of four contactors 18'. The contactors 18' are in permanent wiping electrical contact with the drum 16.

An engine starting circuit 19 is arranged to be brought into operation whenever a push-button 20 is depressed. On the depression of the push-button 20, the engine starting circuit 19 supplies electrical current for a predetermined limited period to all the contactors 18. If, for example, a group of contactors 18 are in electrical contact with the contact segments 17 of the gas turbine engine 11, electrical current will be supplied via the respective contactors 18' to the igniter of the gas turbine engine 11. The igniters of the other gas turbine engines 12–14 will not, however, be supplied with electrical current, since the respective contact segments 17 will be out of contact with the respective contactors 18.

The supply of electrical current from the engine starting circuit 19 is arranged to continue for a length of time such as to permit the respective gas turbine engine to be brought into self-sustaining operation.

The gas turbine engines 11–14 are connected by leads 21, 22, 23, 24 respectively to a common lead 25 which extends to a negative or earth return line 26. The connection between the leads 21–23 and the lead 25 is effected by way of solenoids 30, 31, 32, 33 respectively. The solenoids 30–33, when energised, respectively effect closure of normally open switches 34, 35, 36, 37. The switches 34–37 are connected in a circuit 40 which includes a solenoid 41, the circuit 40 being connected at one end to the lead 25 and being connected at the other end to a line 42 which is itself connected to the positive terminal (not shown) of a D.C. supply source (not shown).

The leads 21–24 are respectively connected by leads 43, 44, 45, 46, to a common lead 47 which is connected to the line 26. The leads 43–46 respectively include solenoids 50, 51, 52, 53.

Th solenoids 50–53, when energised, respectively effect closure of normally open switches 54, 55, 56, 57, the switches 54–57 being respetcively incorporated in leads 60, 61, 62, 63. The leads 60–63 are connected to the positive line 42, by way of a lead 64 which incorporates a normally closed switch 65 and a solenoid 66. The normally closed switch 65 is arranged to be opened on energisation of the solenoid 41.

The solenoid 66, when energised, effects closure of a normally open switch 70. The switch 70 is incorporated in a circuit 71 which extends between the lines 26, 42 and incorporates an electric motor 72. The electric motor 72 is arranged to drive the drum 16 through a shaft 73.

The leads 60–63 are respectively connected to contactors 74–77 which are in permanent electrical wiping contact with the drum 16.

The drum 16 is provided with four contact segments 80, 81, 82, 83, each of which extends around a limited angular portion of the drum, the contact segments 80–83 being respectively spaced from each other by 90° intervals.

The contact segments 80–83 are respectively adapted to make electrical contact with contactors 84–87, each of the contactors 84–87 being disposed adjacent to, but spaced from, the drum 16. The contactors 84–87 are connected by a common lead 90 to the line 26.

The arrangement is such that when, say, the gas turbine engine 11 has been brought into self-sustaining operation, a generator (not shown) driven thereby supplies current to the lead 21. The solenoids 30, 50 are thereby energised, with the result that closure is effected of the normally open switches 34, 54. The closure of the switch 54 will however complete an electrical circuit from the line 26 to the line 42, the said circuit comprising the lead 90, contactor 84, contact segment 80, contactor 74, lead 60, and lead 64. Energisation will therefore occur of the solenoid 66, with the result that the electric motor 72 will be brought into operation.

As soon, however, as the electric motor 72 is brought into operation, the contact segment 80 is moved out of contact with the contactor 84. Accordingly, the solenoid 66 is de-energised, the normally open switch 70 is once more opened, and the power supply to the electric motor 72 is cut off. The inertia of the drum 16 is, however, arranged to be such that the drum 16 continues to rotate until the contact segment 81 is brought into electrical contact with its contactor 85.

If the driver of the locomotive should now depress the push-button 20, the engine starting circuit 19 will once again be brought into operation. Electrical current will, however, this time be supplied to the gas turbine engine 12, since the rotation of the drum 16, referred to above, will have brought the contact segments 17 of the gas turbine engine 12 into contact with the respective contactors 18. Once the gas turbine engine 12 has been brought into self-sustaining operation, the solenoids 31, 51 will be energised, with resulting closure of the normally open switches 35, 55.

The closure of the switch 55 however, will cause an electrical circuit to be made between the line 26 and the line 42, this circuit comprising lead 90, contactor 85, contact segment 81, contactor 75, lead 61, and lead 64. The solenoid 66 will therefore once more be energised, whereby the normally open switch 70 will be closed, as a result of which the electric motor 72 will rotate the drum 16 so as to bring the contact segment 82 into electrical contact with the contactor 86.

Similarly, as will be appreciated, when the push-button 20 is once more depressed, the next gas turbine engine, namely the gas turbine engine 13, will be brought into operation, and when this operation is self-sustaining, the drum 16 will rotate through 90°, so as to bring the parts into a position in which starting can be effected, when required, of the gas turbine engine 14.

When, however, the gas turbine engine 14 has itself been brought into operation, following a further depression of the push-button 20, rotation does not occur of the drum 16, such rotation being undesirable at this stage since all the contactors 74–77, are at this time, "live," and were it not for the arrangement described immediately below, the electric motor 72, if once started when all the engines 11–14 were in operation, would continuously rotate.

Accordingly, when all the gas turbine engines 11–14 are in operation, all the normally open switches 34–37 will be closed, whereby the solenoid 41 will be energized. The normally closed switch 65 will thereby be opened, so as to render impossible the energisation of the solenoid 66 and consequent actuation of the electric motor 72.

It will therefore be appreciated that the gas turbine engines 11–14 will always be brought into operation, one after another, in a predetermined sequence. Thus (assuming that all four engines are being used simultaneously), the engines will first be brought into operation in the sequence 11, 12, 13, 14, they will next time be brought into operation in the sequence 14, 11, 12, 13, they will thereafter be brought into operation in the sequence 13, 14, 11, and 12, and the next time they will be brought into operation in the sequence 12, 13, 14, 11 and so on. All engines will therefore receive substantially equal wear.

A stop selection switch 92 is provided so that the driver may, if desired, stop one or more of the gas turbine engines 11–14. The switch 92 has four operative positions, and when the switch is in the position 1, shown, it will serve to cut-out the gas turbine engine 11. Thus, if at that time, all four gas turbine engines 11–14 were operating, the normally open switches 34, 54, would be opened, the solenoid 41 would be de-energized, and the normally closed switch 65 would therefore be closed. Since the remaining gas turbine engines would remain running, the electric motor 72 would rotate the drum 16 until it reached the position corresponding to that in which the gas turbine engine 11 could be brought into operation by the engine starting circuit 19. When the drum 16 does reach this position, it will stop. When it is therefore desired to bring in a fourth engine once again, the next time the push-button 20 is depressed the gas turbine engine 11 will be connected to the engine starting circuit 19.

If it is desired to stop all four gas turbine engines 11–14 simultaneously, this may be effected by depressing a push-button 93 forming part of the stop selection switch 92.

In the event of an engine failure, an engine protection circuit (not shown) will energise the respective one of the solenoids 30–33, and the respective one of the solenoids 50–53, which will in turn ensure that the particular engine concerned will automatically be by-passed in any starting sequence.

In FIGURES 3–6, there is shown an alternative embodiment of power plant which may be used on the locomotive 10. The manner in which the power plant of FIGURES 3–6 operates, is, however, generally similar to that of FIGURE 2, and similar parts have therefore been given the same reference numerals with the addition of the suffix *a*.

In the embodiment of FIGURES 3–6, the engine starting circuit 19a is connected to the gas turbine engines 11–14, by way of switches 100, 101, 102 and 103 respectively. The switches 100–103 are operated by way of rollers 104, 105, 106, 107 respectively (see FIG. 5). The rollers 104–107 are angularly spaced apart from each other by 90° intervals and each of these rollers is adapted to cooperate with a common cam 110. Thus, in the position shown in FIGURE 5, the cam 110 is effecting closure of the switch 100, the remaining switches 101, 102 and 103 being open. Accordingly, when the parts are in the FIGURE 5 position, the engine starting circuit 19a is connected to the gas turbine engine 11 only.

The cam 110 is securely mounted on a shaft 111 which is itself secured to and within a sleeve 112, the sleeve 112 being formed at one end with a ratchet 113. The sleeve 112 is rotatably mounted within a pinion 114 which is provided with a pawl 115 which engages the ratchet 113. A spring 116 urges the pawl 115 into driving engagement with the ratchet 113.

The shaft 111 is provided with four recesses 117 which are spaced from each other by 90° intervals and which are adapted to receive a spring urged ball detent 118.

The pinion 114 meshes with a rack 119, opposite ends of which are provided with pistons 120, 121. The pistons 120, 121 are respectively mounted in cylinders 122, 123.

A valve body 124 (FIG. 6) is provided with a chamber 125. The chamber 125 may be provided with a pressure fluid, such as compressed air, by way of a pipe 126. The chamber 125 is adapted, when a valve member 127 is in the position shown, to communicate via a pipe 130 with the outer end of the cylinder 122. In this position of the parts, the outer end of the cylinder 123 will communicate by way of a pipe 131 and valve member 132 with a vent pipe 133. Thus, in the position of the parts shown, pressure fluid is supplied to one side of the piston device constituted by the pistons 120–121, and is withdrawn from the opposite side thereof. Accordingly, the said piston device is moved in one of its directions of movement.

The valve members 127, 132, are connected to a common pivoted beam 134 which is urged by a spring 135 into a predetermined position. The beam 134 may, however, be tilted in the opposite way about its pivot on energisation of a solenoid 136. When the solenoid 136 is so energised, the valve member 127 will be moved into a position in which the chamber 125 and pipe 130 are out of communication, whilst the valve member 132 will be moved into a position in which the chamber 125 and the pipe 131 will communicate. The piston device 120, 121, will therefore be moved towards the left, as seen in FIG. 6, pressure fluid being exhausted through a vent passage 137. As will readily be appreciated, this reciprocation of the piston device 120, 121, will effect stepping round of the ratchet 113, and hence of the cam 110.

The arrangement is such that the solenoid 136 is energised when the push-button 20a is depressed and is de-energised when the respective gas turbine engine has been brought into self-sustaining operation. Thus, the cam 110 will be stepped round from one position to the next position each time an engine has been brought into self-sustaining operation.

We claim:

1. Power plant comprising a plurality of engines, individual engines of which are adapted to be brought into operation one after another in a predetermined sequence, starting means for starting each of said engines, manually operable means which when operated brings the starting means into operation for a limited period only, said limited period being of sufficient duration to ensure that the respective engine is brought into self-sustaining operation, a selector device which may be set in a plurality of positions corresponding in number to the number of engines, the selector device when in each said position connecting the starting means to a selected one only of said engines, and setting means which, whenever a said selected engine has been brought into self-sustaining operation, but at least one of the engines nevertheless remains inoperative, sets the selector device in the next said position, whereby when the said manually operable means is thereafter operated the next engine in said sequence will be brought into operation by said starting means.

2. Power plant comprising a plurality of engines, individual engines of which are adapted to be brought into operaion one after another in a predetermined sequence, starting means for starting each of said engines, manually operable means which when operated brings the starting means into operation for a limited period only, said limited period being of sufficient duration to ensure that the respective engine is brought into self-sustaining operation, a movable member which may be set in a plurality of positions corresponding in number to the number of engines, the movable member when in each said position establishing an electrical connection between the starting means and a selected one only of said engines, and setting means which, whenever a said selected engine has been brought into self-sustaining operation, but at least one of the engines nevertheless remains inoperative, sets the movable member in the next said position, whereby when the said manually operable means is thereafter operated the next engine in said sequence will be brought into operation by said starting means.

3. Power plant comprising a plurality of engines, individual engines of which are adapted to be brought into operation one after another in a predetermined sequence, starting means for starting each of said engines, manually operable means which when operated brings the starting means into operation for a limited period only, said limited period being of sufficient duration to ensure that the respective engine is brought into self-sustaining operation, a rotary member which may be set in a plurality of angularly spaced apart positions corresponding in number to the number of engines, the rotary member when in each said position electrically connecting the starting means to a selected one only of said engines, and setting means which, whenever a said selected engine has been brought into self-sustaining operation, but at least one of the engines nevertheless remains inoperative, rotates the rotary member stepwise from one said position to the next, whereby when the said manually operable means is thereafter operated the next engine in said sequence will be brought into operation by said starting means.

4. Power plant comprising a plurality of engines, individual engines of which are adapted to be brought into operation one after another in a predetermined sequence, starting means for starting each of said engines, electrical connections between the starting means and the various engines, each electrical connection including a normally open switch, manually operable means which when operated brings the starting means into operation for a limited period only, said limited period being of sufficient duration to ensure that the respective engine is brought into self-sustaining operation, a rotary cam which may be set in a plurality of angularly spaced apart positions corresponding in number to the number of engines, the rotary cam when in each said position closing one particular switch so as to connect the starting means to a selected one only of said engines, and setting means which, whenever a said selected engine has been brought into self-sustaining operation, but at least one of the engines nevertheless remains inoperative, rotates the rotary cam to the next said position, whereby when the said manually operable means is thereafter operated the next engine in said sequence will be brought into operation by said starting means.

5. Power plant as claimed in claim 4 in which the setting means comprises a ratchet which is drivingly connected to the rotary cam, a pawl engaging said ratchet, and means for effecting limited angular movement of said pawl in alternate directions of rotation.

6. Power plant as claimed in claim 5 comprising a pinion which carries said pawl, a rack which meshes with said pinion, a double acting piston device which is connected to said rack, and means for alternately admitting pressure fluid to one or other side of the piston device and for withdrawing it from the opposite side thereof, pressure fluid being supplied to one said side when the manually operable means are operated, and, when a said selected engine has been brought into self-sustaining operation, pressure fluid being supplied to the opposite side.

7. Power plant comprising a plurality of engines, individual engines of which are adapted to be brought into operation one after another in a predetermined sequence, starting means for starting each of said engines, electrical connections between the starting means and the various engines, manually operable means which when operated brings the starting means into operation for a limited period only, said limited period being of sufficient duration to ensure that the respective engine is brought into self-sustaining operation, an electrically conducting rotary drum which may be set in a plurality of positions corresponding in number to the number of engines, the drum when in each said position electrically connecting the starting means to a selected one only of said engines, a plurality of contact segments on said drum each of which extends around a limited angular portion of the drum, the contact segments being angularly spaced from each other, a plurality of contactors which are disposed adjacent the drum and which are respectively adapted to co-operate with the various contact segments, each said electrical connection comprising a respective contact segment and contactor, and setting means which, whenever a said selected engine has been brought into self-sustaining operation, but at least one of the engines nevertheless remains inoperative, rotates the drum stepwise from one said position to the next, whereby when the said manually operable means is thereafter operated the next engine in said sequence will be brought into operation by said starting means.

8. Power plant comprising a plurality of engines, individual engines of which are adapted to be brought into operation one after another in a predetermined sequence, starting means for starting each of said engines, electrical connections between the starting means and the various engines, manually operable means which when operated brings the starting means into operation for a limited period only, said limited period being of sufficient duration to ensure that the respective engine is brought into self-sustaining operation, an electrically conducting rotary drum which may be set in a plurality of positions corresponding in number to the number of engines, the drum when in each said position electrically connecting the starting means to a selected one only of said engines, a plurality of contact segments on said drum each of which extends around a limited angular portion of the drum, the contact segments being angularly spaced from each other, a plurality of contactors which are disposed adjacent the drum and which are respectively adapted to co-operate with the various contact segments, each said electrical connection comprising a respective contact segment and contactor, a plurality of second contact segments each of which extends around a limited angular portion of the drum, the second contact segments being angularly spaced from each other, a plurality of second contactors disposed adjacent the drum and adapted to co-operate with the second contact segments, each second contact segment and its second contactor forming part of an electrical circuit including a normally open switch and an electric motor which is arranged to rotate the drum, and means for effecting closure of said normally open switch whenever the respective engine has been brought into self-sustaining operation, the electric motor being brought into operation to rotate the drum whenever a said electrical circuit is completed, and such rotation breaking the said electrical circuit but, due to the inertia of the drum, continuing until the next second contact segment on the drum is brought into contact with the respective second contactor.

9. Power plant as claimed in claim 8 in which each said electrical circuit also includes a normally closed switch, means being provided for opening the normally closed switch whenever all the engines are in operation.

10. Power plant as claimed in claim 9 comprising means for preventing a selected engine from being brought into operation by the starting means.

No references cited.

JULIUS E. WEST, *Primary Examiner*.